United States Patent
Ozeki et al.

(10) Patent No.: US 7,308,205 B2
(45) Date of Patent: Dec. 11, 2007

(54) OPTICAL TRANSMISSION APPARATUS

(75) Inventors: Shinobu Ozeki, Kanagawa (JP); Akira Toshima, Kanagawa (JP); Masao Funada, Kanagawa (JP); Kenichi Kobayashi, Kanagawa (JP); Hidenori Yamada, Kanagawa (JP); Takeshi Kamimura, Kanagawa (JP); Yoshihide Sato, Kanagawa (JP); Junji Okada, Kanagawa (JP); Takehiro Niitsu, Kanagawa (JP); Shinya Kyozuka, Kanagawa (JP); Kazuhiro Sakai, Kanagawa (JP); Kazuhiro Suzuki, Kanagawa (JP); Tomo Baba, Kanagawa (JP); Tsutomu Hamada, Kanagawa (JP); Masaru Kijima, Kanagawa (JP); Osamu Takanashi, Kanagawa (JP); Masaaki Miura, Kanagawa (JP); Osamu Ueno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 818 days.

(21) Appl. No.: 10/397,428

(22) Filed: Mar. 27, 2003

(65) Prior Publication Data

US 2004/0057731 A1 Mar. 25, 2004

(30) Foreign Application Priority Data

Sep. 20, 2002 (JP) ............................. 2002-276079

(51) Int. Cl.
*H04B 10/00* (2006.01)

(52) U.S. Cl. .................... 398/164; 398/58; 398/59; 398/60; 398/71; 398/72; 398/73; 398/15; 398/36; 398/33; 398/82; 398/83; 398/100; 398/182; 398/183; 398/202; 398/135; 398/138; 398/139; 398/141; 398/79; 385/24; 385/15; 385/31; 385/53; 385/88; 385/89; 385/92; 385/93; 250/227.11

(58) Field of Classification Search ................ 398/164, 398/141, 135, 128, 130, 138, 167.5, 168, 398/182, 183, 202, 186, 59, 60, 15, 36, 165, 398/79, 82, 83, 100, 58, 66, 67, 71, 139, 398/72, 73, 33; 385/15, 24, 31, 53, 88, 89, 385/92, 93; 250/227.11
See application file for complete search history.

(56) References Cited

U.S. PATENT DOCUMENTS

| | | | |
|---|---|---|---|
| 4,063,220 A * | 12/1977 | Metcalfe et al. | 370/462 |
| 6,441,935 B1 * | 8/2002 | Araki et al. | 398/52 |
| 6,724,993 B2 * | 4/2004 | Koike et al. | 398/9 |
| 2002/0101874 A1 * | 8/2002 | Whittaker et al. | 370/402 |

FOREIGN PATENT DOCUMENTS

JP A 2002-62457 2/2002

* cited by examiner

*Primary Examiner*—Hanh Phan
(74) *Attorney, Agent, or Firm*—Oliff & Berridge, PLC

(57) ABSTRACT

In an optical transmission apparatus in which a plurality of nodes are optically connected to one another via an optical transmission path, a light signal which is coded so that a mixture ratio of 1 and 0 constituting data is made close to 50% is transmitted through the optical transmission path. When a light signal is not emitted from all of the nodes, a dummy signal which is an AC-like signal is emitted to the optical transmission path. Therefore, an optoelectric conversion section can be always set to an active state, and the signal recognizability can be prevented from being lowered.

7 Claims, 7 Drawing Sheets

OPTICAL TRANSMISSION APPARATUS

The present disclosure relates to the subject matter contained in Japanese Patent Application No. 2002-276079 filed on Sep. 20, 2002, which is incorporated herein by reference in its entirety.

BACKGROUND OF THE INVENTION

1. Field of the Invention

The present invention relates to an optical transmission apparatus which transmits data by means of light for the purposes of, for example, increase of the data rate between boards, chips, or the like, and reduction of electromagnetic noises.

2. Description of the Related Art

Recently, attention is given to an intrasystem optical connection technique which is called short-distance optical interconnection. For example, intraboard optical interconnection which connects semiconductor elements with each other via optical wiring receives attention. An electro-optic circuit board in which a transparent medium having a function of optical wiring is disposed on a printed circuit board for electric wiring has been proposed.

JP-A-2002-62457 is a prior technical literature related to the invention.

FIG. 8 shows an optical signal transmission device (hereinafter, refereed to as "optical transmission path") 3 which is disclosed in JP-A-2002-62457. Stair-like steps are formed on a transparent medium 30 which is made of inorganic glass or a plastic material such as polymethyl methacrylate, polycarbonate, or amorphous polyolefin. A reflective light diffusing section 31 is formed on one end face of the transparent medium 30. On the ends of the steps, 45-degree faces 32A, 33A, 34A, and 35A are respectively disposed. Their upper faces are optically coupled with a light emitting element and a light receiving element to function as entering and emitting faces for a light signal.

FIG. 8A shows optical transmission in the transparent medium 30 in the case where a light signal L enters from the upper face of the 45-degree face 35A. The light signal L propagates through the transparent medium 30, and reflected and diffused by the reflective light diffusing section 31 as shown in the figure, and then reflected by the 45-degree faces 32A, 33A, 34A, and 35A toward their upper faces to be emitted therefrom.

FIG. 8B shows optical transmission in the transparent medium 30 in the case where a light signal L enters from the upper face of the 45-degree face 32A. The light signal L propagates through the transparent medium 30, and reflected and diffused by the reflective light diffusing section 31 as shown in the figure, and then reflected by the 45-degree faces 32A, 33A, 34A, and 35A toward their upper faces to be emitted therefrom.

When the optical transmission path 3 having the transparent medium 30 is used as an optical data bus, a light signal can be rapidly transmitted without producing a signal delay caused by the capacitances between electrical connection wirings and the resistances of the wirings.

In the case where optical transmission is to be performed at a high speed, a high-pass filter is usually used in a reception section in order to enhance the noise resistance and extract modulated components of the light intensity. In such a configuration, when signals of the same code are continuously input into the reception section for a given time period or longer, the quantization level becomes unstable and the signal recognizability is lowered. Moreover, there arises a disadvantage that a long time period must elapse before the signal recognizability is returned to the normal one. Therefore, a signal must be adequately coded so that the same code is not continuous.

As an example of such a coding method, known is the 8B10B coding method which is employed in standards such as Fiber Channel Standard. In the 8B10B coding method, a set of 8-bit signals is converted into a 10-bit signal in accordance with a given rule, and the signal is serialized in 10 to 1, whereby the mixture ratio of 1 and 0 is made close to 50%.

According to the 8B10B coding process, in a many-to-many communication in which a plurality of circuit boards (hereinafter, referred to as "nodes") each having an optical communication section consisting of a light emitting element and a light receiving element are optically connected to one another via the optical transmission path 3 shown in FIG. 8, a light signal which is coded in a transmission section is emitted to be transmitted, and the light signal received by a receiving section is decoded, whereby high-speed data transmission is enabled. In this configuration, an AC-like light signal always flows through the optical transmission path 3, and hence the receiving section can be always set to an active state.

In such a conventional optical transmission apparatus, there is the possibility that, in a many-to-many communication, light signals are emitted from plural nodes at the same time. Consequently, there arises the problem in that, when the timings of the emissions coincide with one another, the light signals the amount of which exceeds an allowable light amount of the receiving section enter the receiving section, thereby damaging the receiving section or lowering the signal recognizability.

SUMMARY OF THE INVENTION

It is an object of the invention to provide an optical transmission apparatus in which transmission timings of plural nodes do not coincide with one another, the signal recognizability is prevented from being lowered, and high-speed stable optical transmission that is excellent in reliability can be realized.

In order to attain the object, an aspect of the invention provides an optical transmission apparatus for transmitting an optical signal. The optical transmission apparatus includes a plurality of circuit boards and an optical transmission path. The plurality of circuit boards each includes a data conversion section, an optical communication section, and a control section. The data conversion section converts transmission data into conversion data in which mixture ratio of signals "0" and signals "1" is a constant. The optical communication section outputs the optical signal based on the conversion data. The optical transmission path connects the circuit boards optically. The control section monitors the optical transmission path and sets the optical communication section in a waiting state when the optical transmission path operates.

According to the configuration, in a light signal entering the optical communication section, 1 or 0 does not continue over a given length, whereby lowering of the signal recognizability due to unstabilization of the quantization level can be prevented from occurring. Since the light signals from the plural circuit boards do not enter the optical transmission path at the same time, the optical communication section can stably operate.

BRIEF DESCRIPTION OF THE DRAWINGS

FIG. 1 shows an optical transmission apparatus of a first embodiment of the invention.

DETAILED DESCRIPTION OF THE PREFERRED EMBODIMENT

Figure 1A:
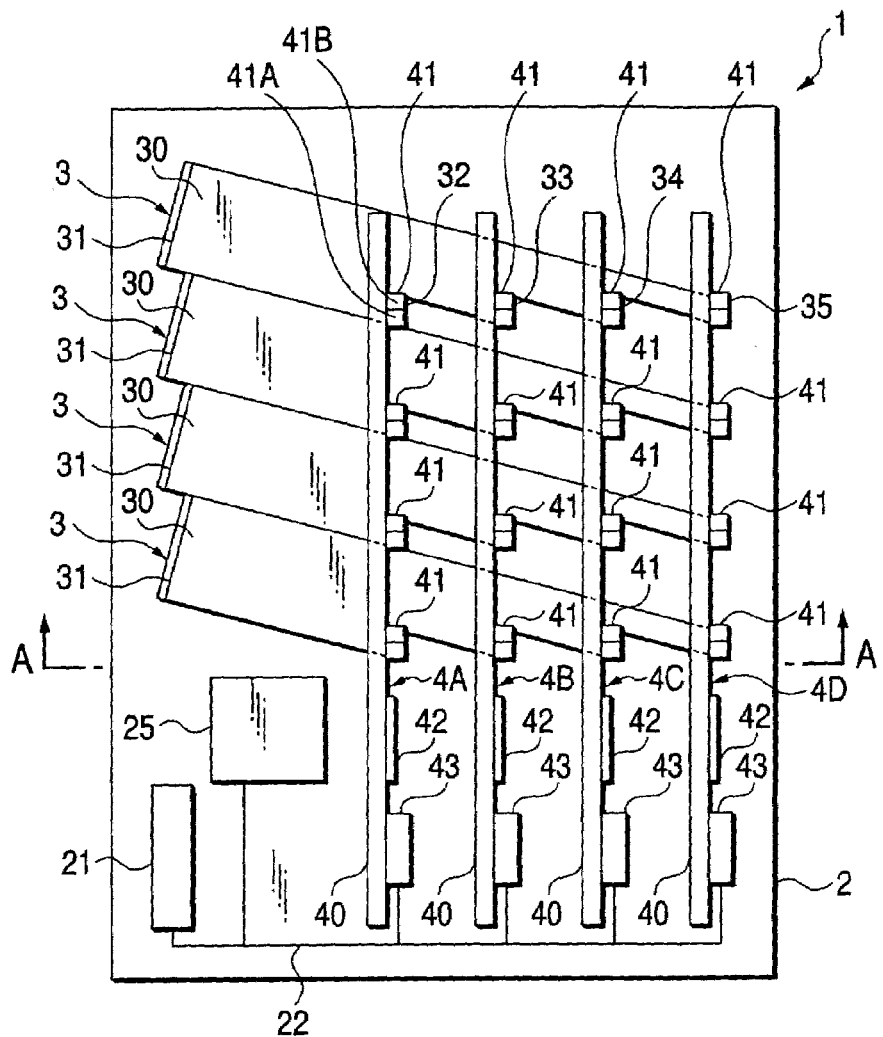
FIG. 1A is a plan view.
Figure 1B:
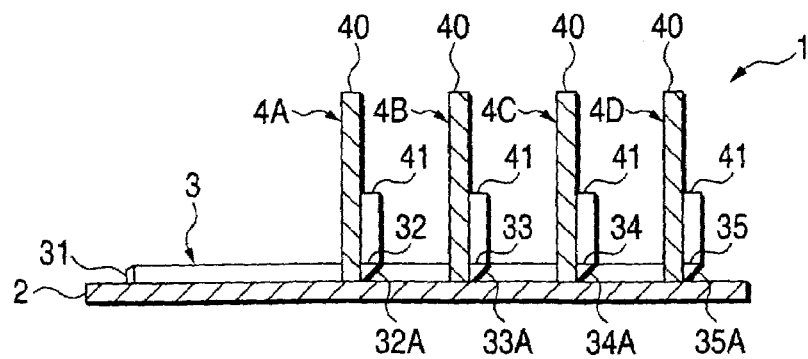
FIG. 1B is a section view taken along the line A-A in FIG. 1A.

FIG. 1 shows an optical transmission apparatus 1 of a first embodiment of the invention, FIG. 1A is a plan view, and FIG. 1B is a section view taken along the line A-A in FIG. 1A. The optical transmission apparatus 1 is configured by a substrate 2, a plurality (in the figure, four) of optical transmission paths 3 which are mounted on the substrate 2, and a plurality (in the figure, four) of nodes 4A, 4B, 4C, and 4D, so that a many-to-many communication among the nodes is enabled. The nodes 4A, 4B, 4C, and 4D are configured in the same manner. In the following description, therefore, each of the nodes will be described as a node 4 except the case where the configuration and operation of the plural nodes are described.

The substrate 2 has: an electric signal input/output section 21 through which operations of inputting and outputting electric signals from and to an external apparatus (not shown) are performed; a wiring section 22 which electrically connect the nodes 4A, 4B, 4C, and 4D to one another; and a semiconductor device 25 which controls operations of the electric signal input/output section 21 and the nodes 4A, 4B, 4C, and 4D.

Each of the optical transmission paths 3 has: a transparent medium 30; a reflective light diffusing section 31 which is disposed on one end face of the transparent medium 30: and stair-like steps 32, 33, 34, and 35 which are disposed on the transparent medium 30. On the ends of the steps 32, 33, 34, and 35, 45-degree faces 32A, 33A, 34A, and 35A are disposed, respectively. Their upper faces are optically coupled with a light emitting element and a light receiving element to function as entering and emitting faces for a light signal. The optical transmission paths are positioned and fixed so that, when they are mounted on the substrate 2, predetermined positional relationships are established with respect to the nodes 4A, 4B, 4C, and 4D. Each of the optical transmission paths 3 corresponds to one bit. In the case where the four optical transmission paths 3 are used as shown in the figure, four-bit transmission is performed. The number of the optical transmission paths is not particularly restricted. For the sake of simplicity, the following description is conducted with respect to only one of the optical transmission paths 3.

The transparent medium 30 is configured by a planar core, and a clad which is formed on the upper, lower, and right and left side faces of the core except the 45-degree faces, and which is lower in refractive index than the core. The core is made of, for example, a plastic material such as polymethyl methacrylate (PMMA), polycarbonate, or amorphous polyolefin, or inorganic glass. The clad is made of a fluoroploymer or the like.

The reflective light diffusing section 31 is made of a metal material such as aluminum and formed by a film forming method such as sputtering. Alternatively, the reflective light diffusing section 31 may be formed by another method as far as the transparency of the film formation face is not lowered and the optical transmission path 3 is not thermally affected.

The node 4 has: a substrate 40; laser diodes 41A which are light emitting elements that emit a light signal to the respective optical transmission paths 3; photodiodes 41B which are light receiving elements that receive a light signal entering from the respective optical transmission paths 3; optical communication sections 41 which are configured by the laser diodes 41A and the photodiodes 41B; a processing circuit section 42 which is a semiconductor device having a laser driving circuit, a data conversion section, and the like; and a connector section 43 which electrically connects the node 4 to the wiring section 22 of the substrate 2.

The optical communication sections 41 are positioned and fixed to the substrate 40 so that, when the substrate 40 is mounted on the substrate 2, the optical communication sections 41 are optically connected to the steps 32, 33, 34, or 35 of the optical transmission paths 3 with a predetermined accuracy.

Figure 2:
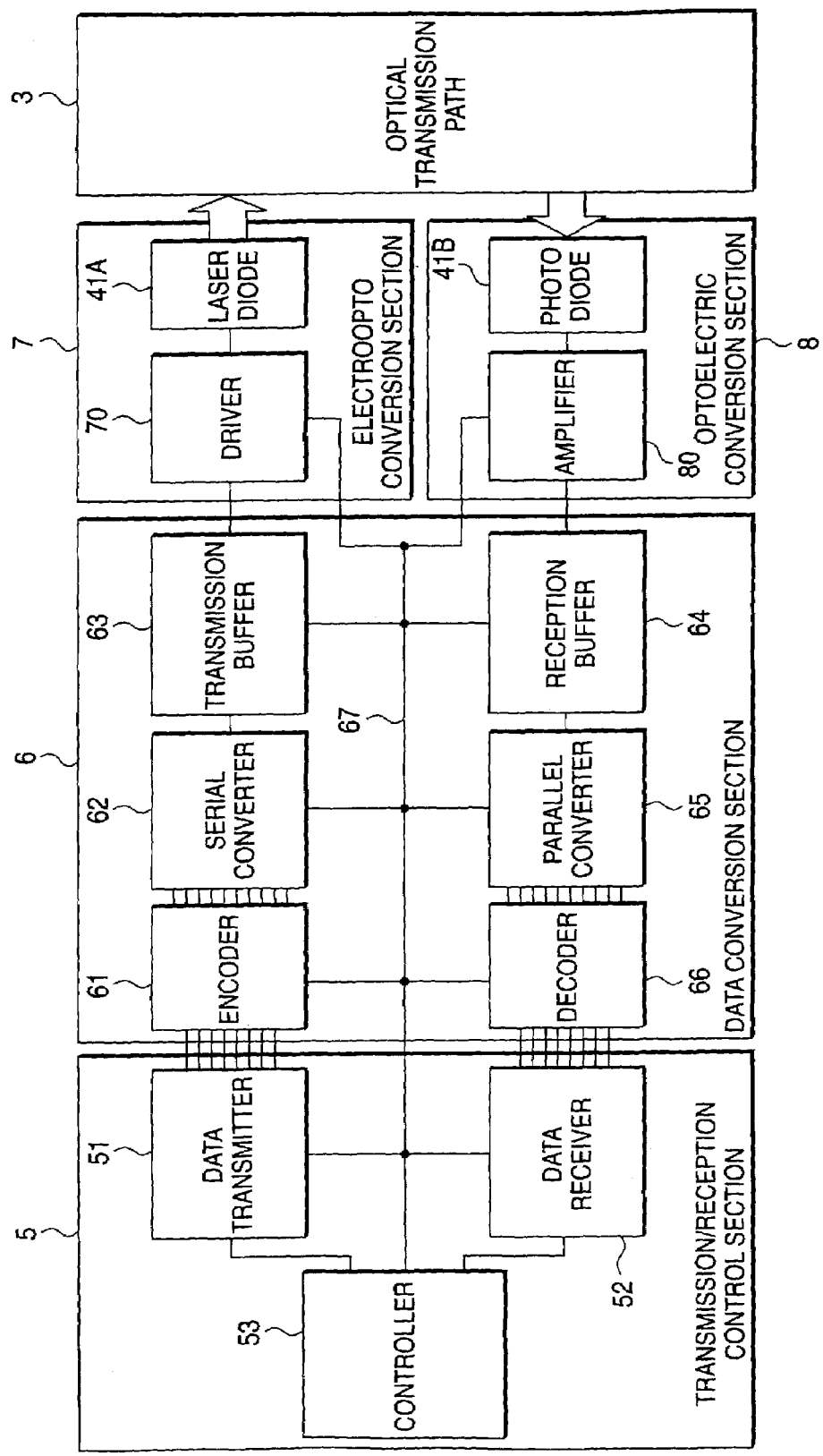
FIG. 2 is a block diagram of a node in the first embodiment of the invention.

FIG. 2 is a block diagram of the node 4. The node 4 is configured by a transmission/reception control section 5, a data conversion section 6, an electrooptic conversion section 7, and an optoelectric conversion section 8. These sections are disposed in the processing circuit section 42.

The transmission/reception control section 5 has: a data transmitter 51 which outputs 8-bit parallel data as data to be transmitted; a data receiver 52 which receives transmitted 8-bit parallel data; and a controller 53 which receives and outputs parallel data and controls a bus 67 for transmitting a control signal.

The controller 53 monitors the state of the optical transmission path 3 on the basis of the light reception state of the photodiodes 41B, and, in accordance with the state, outputs a control signal into the bus 67. When one of the nodes 4 emits a light signal to the optical transmission path 3, a driving signal is not supplied to the electrooptic conversion sections 7 of the other nodes 4, and the laser diodes 41A of the other nodes 4 are set to a waiting mode. The controller 53 of the node 4, which is emitting the light signal, outputs a busy signal indicative the use of the optical transmission path 3, to the wiring section 22.

The node 4 does not emit a light signal in the following states:
(1) the node is not a bus master nor a bus slave (a node which is accessed by a bus master);
(2) the node is a bus master and in a state of waiting for a data input; and
(3) the node is a bus slave and has not yet received a data read command from a bus master.

Each of the nodes 4 can judge whether the node is in one of the states or not.

When the node is in one of the above states, the controller 53 outputs to the bus 67 a control signal which inhibits the laser diodes 41A from emitting a light signal.

The controller 53 of specific one of the nodes 4 controls the electrooptic conversion section so as to emit a dummy light signal (hereinafter, referred to as "dummy signal") to the optical transmission path 3 when none of the other nodes 4 emits a light signal to the optical transmission path 3. The specific node 4.which is to emit the dummy signal is determined at initialization of the bus, or in accordance with prescribed conditions. The dummy signal is an AC-like signal in which 1 and 0, which constitute data, are combined so that the mixture ratio is close to 50%. It should be noted that it is not necessary that the mixture ratio is equal to 50%. For example, the mixture ration may be in a range of 40% to 60%. The mixture ratio depends on characteristics of a reception circuit.

The data conversion section 6 is configured by: an encoder 61 which performs a coding process of converting 8-bit parallel data into 10-bit parallel data; a serial converter 62 which converts the 10-bit parallel data into serial data; a transmission buffer 63 which outputs the serial data on the basis of a control signal that is received from the controller 53 via the bus 67; a reception buffer 64 which receives transmitted serial data; a parallel converter 65 which converts the serial data into 10-bit parallel data, and a decoder 66 which performs a decoding process of converting the 10-bit parallel data into 8-bit parallel data.

The encoder 61 converts 8-bit parallel data into 10-bit parallel data on the basis of an 8B10B coding algorithm. In the embodiment, an example in which coding is performed in the unit of 8 bits will be described. The coding unit may be an arbitrary number of bits. The coding algorithm is not limited to 8B10B and may be any method as far as the mixture ratio of 1 and 0 in serialized data is in the vicinity of 50%.

The serial converter 62 receives the 10-bit parallel data from the encoder 61, and converts the data into serial data so that the mixture ratio of 1and 0 constituting the data is close to 50%.

The serial converter 62 fixedly stores dummy signal data for generating the above-mentioned dummy signal, as serial data, and, when a command signal for outputting the dummy signal is received from the controller 53, supplies the dummy signal data to the transmission buffer 63.

The transmission buffer 63 has an enable function of stopping the signal supply to a driver 70 when the laser diode 41A is in the waiting mode.

The electrooptic conversion section 7 has the driver 70 which supplies a modulation current and a bias current to the laser diode 41A on the basis of the serial data input from the transmission buffer 63. The driver 70 may have an enable function which is controlled by a control signal input via the bus 67.

The optoelectric conversion section 8 has an amplifier 80 which amplifies a light reception signal which is based on a light signal received by the photodiode 41B.

FIGS. 3A to 3D show states of light signals which are transmitted through the optical transmission path 3. In the figures, a broken line indicates an insignificant light signal, a solid line indicates the dummy signal (Dummy), a solid double line indicates a significant light signal, and an arrow indicates the transmission direction of a corresponding signal.

Figure 3A:
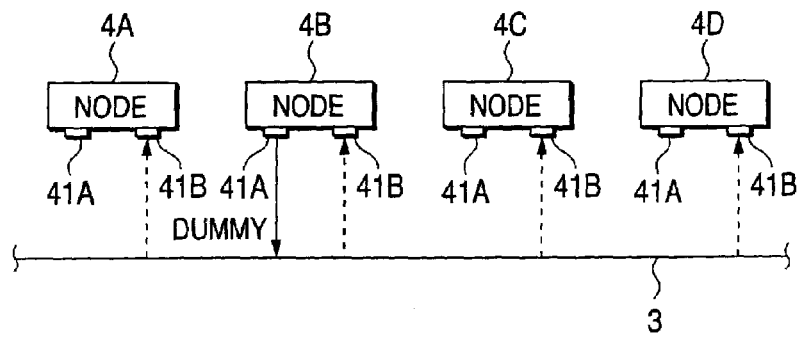
FIGS. 3A to 3D are diagrams illustrating the operations of nodes in the first embodiment of the invention.

FIG. 3A shows a waiting state of the optical transmission path 3. In this state, the laser diode 41A of the node 4B, which is a bus master, emits the dummy signal to the optical transmission path 3, and the photodiodes 41B of the nodes 4A, 4B, 4C, and 4D receive the dummy signal. It should be noted that the bus master may be one of the nodes 4A, 4C, and 4D other than the node 4B, and may be the node 4 which acquires the bus control right in a state where a light signal is not transmitted through the optical transmission path 3. In this case, the dummy signal enters the photodiodes 41B of all the nodes 4, so that the optoelectric conversion sections 8 are set to an active state.

Figure 3B:
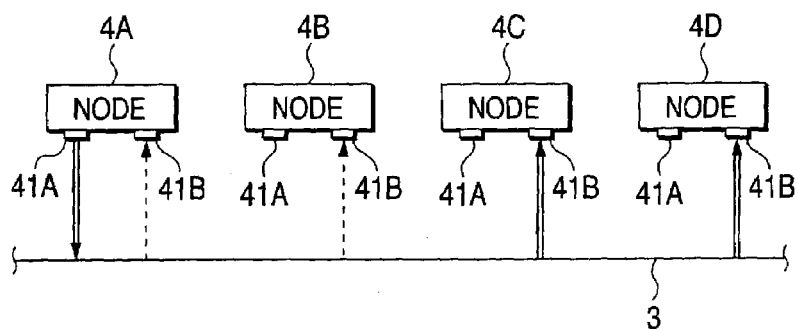

FIG. 3B shows a first state in which the optical transmission path 3 is operating. In this state, the laser diode 41A of the node 4A, which is a bus master, emits a light signal, which requests the nodes 4C and 4D to transmit data, to the optical transmission path 3, and the photodiodes 41B of the nodes 4C and 4D receive the light signal. In the nodes 4A and 4B, the light signal emitted to the nodes 4C and 4D enters the respective photodiodes 41B from the optical transmission path 3, as an insignificant light signal, so that the optoelectric conversion sections 8 are set to an active state.

Figure 3C:
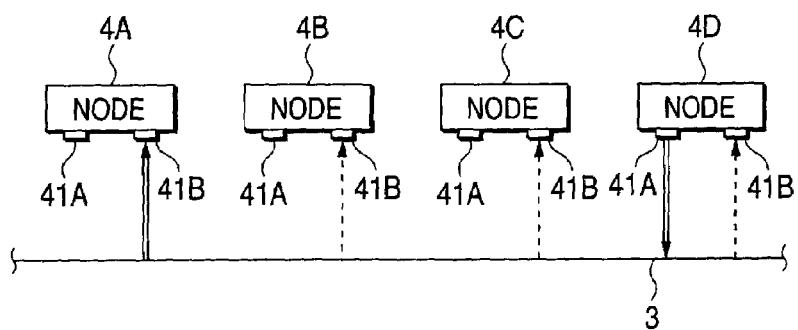

FIG. 3C shows a second state in which the optical transmission path 3 is operating. In response to the light signal, which is emitted from the laser diode 41A of the node 4A in the state of FIG. 3B, the node 4D emits a light signal corresponding to requested data to the optical transmission path 3. In the node 4A, the light signal emitted from the node 4D enters the photodiode 41B from the optical transmission path 3, as a significant light signal. In the nodes 4B, 4C, and 4D, the light signal emitted to the node 4A enters the respective photodiodes 41B from the optical transmission path 3, as an insignificant light signal, so that the optoelectric conversion sections 8 are set to an active state.

Figure 3D:
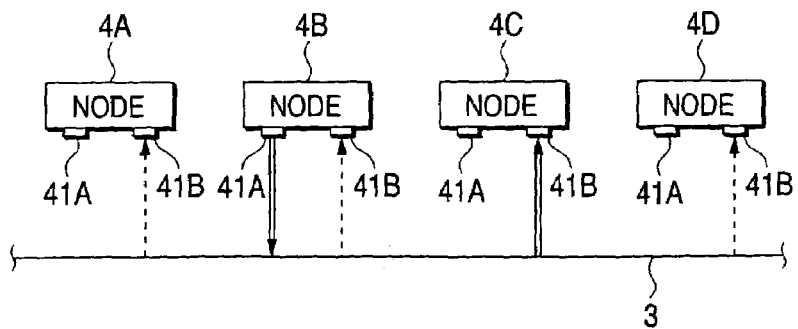

FIG. 3D shows a third state in which the optical transmission path 3 is operating. In this state, the laser diode 41A of the node 4B, which is a bus master, emits a light signal, which requests the node 4C to transmit data, to the optical transmission path 3, and the photodiode 41B of the node 4C receives the light signal. In the nodes 4A, 4B, and 4D, the light signal emitted to the node 4C enters the respective photodiodes 41B from the optical transmission path 3, as an insignificant light signal, so that the optoelectric conversion sections 8 are set to an active state.

Hereinafter, the operation of the first embodiment in the case where data transmission from the node 4A to the node 4D is performed will be described.

When the power source of the optical transmission apparatus 1 is turned on in response to an operation by the operator, the semiconductor device 25 on the substrate 2 controls the laser diode 41A of a predetermined one of the nodes 4 (for example, the node 4A) to emit a light signal, thereby initializing the optical transmission path 3.

Next, the semiconductor device 25 supplies a control signal to the node 4A via the wiring section 22. In the node 4A, the processing circuit section 42 is activated in response to the input of the control signal, and the transmission/reception control section 5 monitors the state of the optical transmission path 3 on the basis of the light reception state of the photodiode 41B. In order to detect the state where the optical transmission path 3 is not used, the controller 53 may monitor whether or not a chip select signal is output to the wiring section 22 under the state where the node does not emit a light signal.

When a data transmission command is supplied from the semiconductor device 25 via the wiring section 22, the controller 53 performs an operation of requesting the bus control right. In the bus control right request operation, a bus control right request signal is supplied to the wiring section 22. When no reply is obtained form the nodes 4, bus arbitration is established and the controller acquires the bus control right. When either of the nodes 4 has the bus control right, a busy signal is returned in response to the bus control right request signal.

In the node 4, which has acquired the control right of the optical transmission path 3, transmission data having a transmission destination is supplied as parallel data from the data transmitter 51 to the data conversion section 6. The data conversion section 6 performs processes of coding and serial conversion on the transmission data, and supplies the resulting data to the electrooptic conversion section 7. In the electrooptic conversion section 7, the laser diode 41A emits a light signal based on the transmission data, to the optical transmission path 3.

In the node 4D of the transmission destination, the light signal entering from the optical transmission path 3 is received by the photodiode 41B of the optoelectric conversion section 8, and then supplied to the data conversion section 6. In the data conversion section 6, serial data, which has been converted in accordance with the received light signal, is temporarily stored in the reception buffer 64, and then supplied to the parallel converter 65 at a predetermined timing. The parallel converter 65 converts the serial data into 10-bit parallel data, and supplies the parallel data to the decoder 66. The decoder 66 decodes the 10-bit parallel data into 8-bit parallel data, and outputs the 8-bit parallel data to the transmission/reception control section 5. In the transmission/reception control section 5, the data receiver 52 receives the 8-bit parallel data, and the transmission is then ended.

Figure 4:
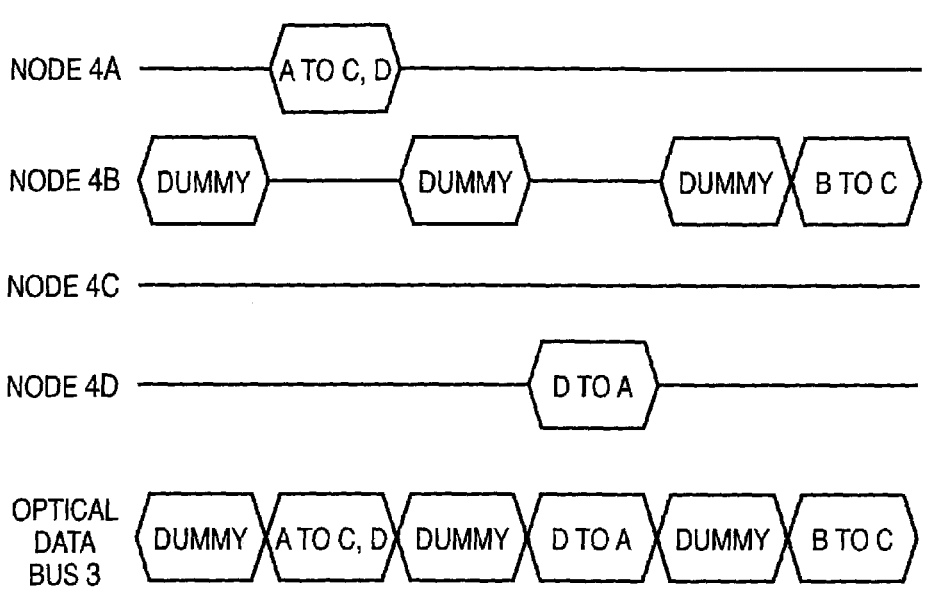
FIG. 4 is a timing chart showing operation timings of the nodes in the first embodiment of the invention.

FIG. 4 is a timing chart showing the operations of the nodes 4. It is assumed that the node 4B outputs a dummy signal. When the time period in which the photodiode 41B does not output a received light signal exceeds a predetermined value, the node 4B controls the laser diode 41A to emit a dummy signal to the optical transmission path 3.

The node 4B monitors bus arbitration. When either of the nodes 4 acquires the bus control right, the node 4B stops the emission of the dummy signal, and the node, 4 which has acquired the bus control right, then performs optical communication. Therefore, one of the nodes 4 emits a light signal to the optical transmission path 3, and a situation in which plural ones of the nodes 4 simultaneously emit a light signal to the optical transmission path does not occur.

Figure 5:
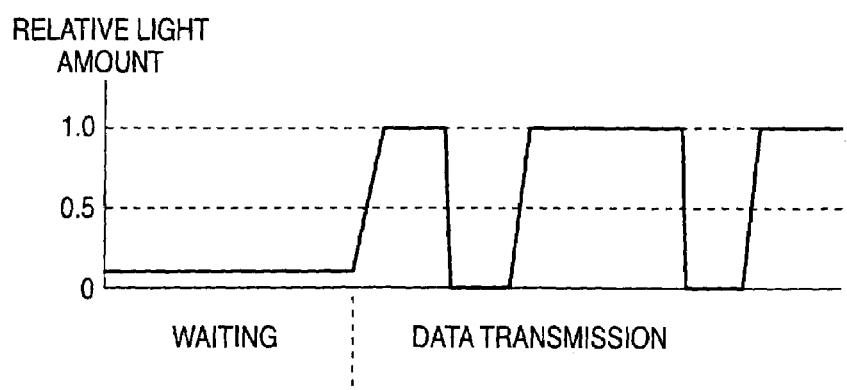
FIG. 5 is a diagram showing the operation of a laser diode in the first embodiment of the invention.

FIG. 5 shows the operations of the laser diodes 41A in the waiting mode and the data transmission mode. Even in the waiting mode, each laser diode 41A is supplied with a minute current, which is lower than a quantization level, to emit a small amount of light, whereby the responsibility in transition from the waiting mode to the data transmission mode is ensured. The amount of the light is set so that the total of the light amount thereof and the amounts of light emitted from the laser diodes 41A of the other nodes 4 does not exceed the allowable light amount of each photodiode 41B. It is noted that the quantization level is a boundary value for dividing an analog light amount into 0 and 1. For example, the quantization level may be half of the maximum light amount.

The first embodiment described above can achieve the following effects.

(1) The node 4 controls the data conversion section 6 so as to generate serial data, which is coded so that 1 and 0 exist at a constant mixture ratio, on the basis of transmission data. In a light signal-emitted from the laser diode 41A, therefore, the state of 1 (emission of light) or 0 (no emission of light) does not continue for a given time period or longer.

Consequently, the signal recognizability of the optoelectric conversion section 8 can be prevented from being lowered, and the optoelectric conversion section 8, which receives a light signal, can stably operate. Since the noise resistance can be enhanced without requiring a noise blocking device such as a filter, the signal quality can be prevented from being lowered even when the speed of the optical communication is increased.

(2) In the optical transmission apparatus in which the plural nodes 4 are optically connected to one another via the optical transmission path 3, a dummy signal, which is an AC-like signal, is emitted to the optical transmission path 3 when a light signal is not emitted from all of the nodes 4. Therefore, the optoelectric conversion sections 8 connected to the optical transmission path 3 can be always set to an active state. As a result, the optical transmission apparatus is provided with excellent responsibility.

(3) Only the node 4, which has acquired the control right on the basis of the bus control right request signal, is enabled to emit a light signal to the optical transmission path 3. Therefore, a light signal the amount of which is larger than the allowable light amount of each photodiode 41B is prevented from being transmitted through the optical transmission path 3.

The first embodiment described above has the configuration in which, when the laser diode 41A is in the waiting mode, the output of a signal to the driver 70 is stopped on the basis of the enabling function of the transmission buffer 63. Alternatively, another method may be employed. For example, the algorithm of the encoder 61 may be modified so that 0 is always output in the waiting mode. In the case where the driver 70 has the enabling function, the operation may be stopped by, in the waiting mode, supplying a control signal to the driver 70.

Figure 6:
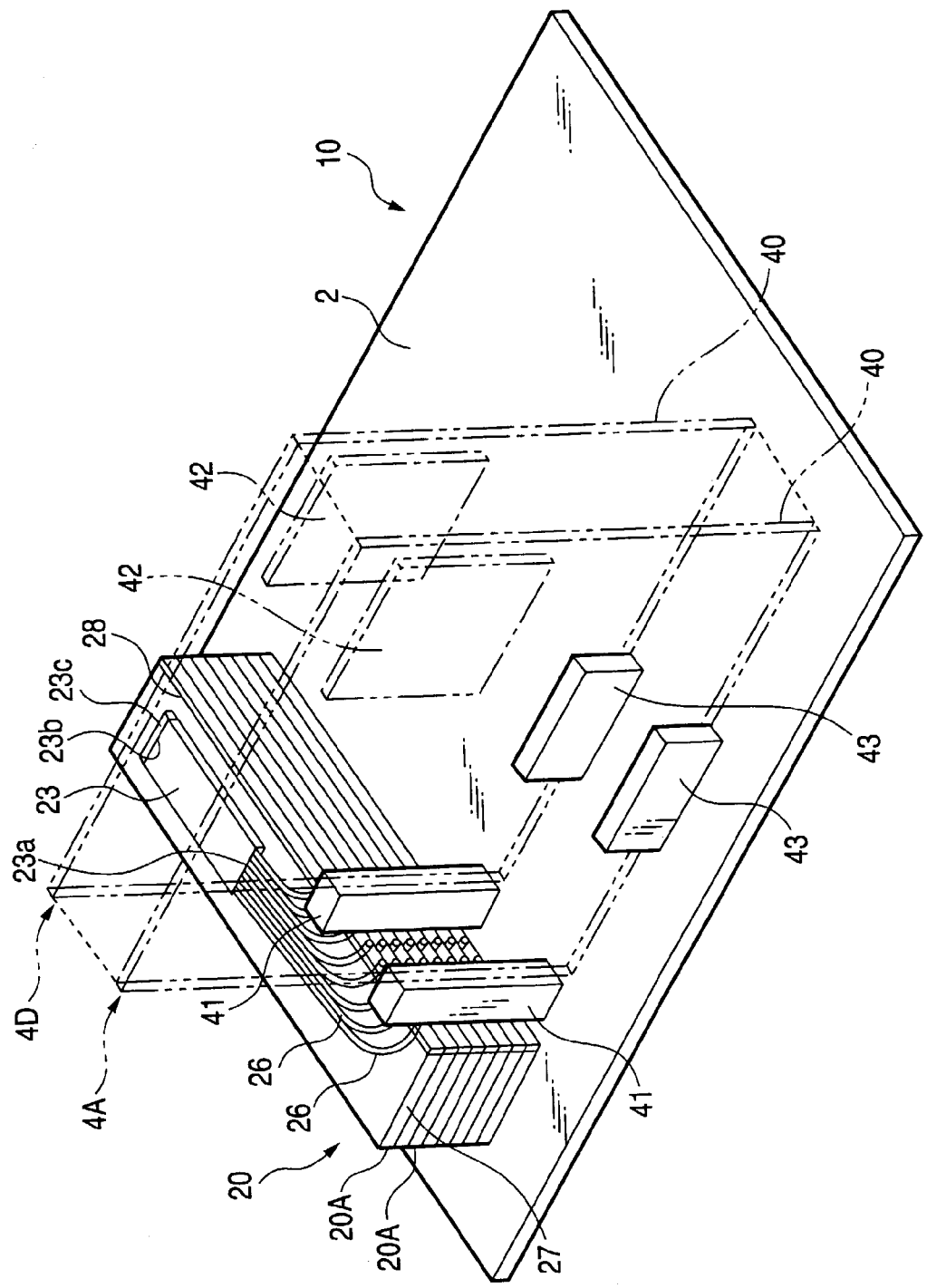
FIG. 6 is a perspective view of an optical transmission apparatus of a second embodiment of the invention.

FIG. 6 shows an optical transmission apparatus 10 of a second embodiment of the invention. The optical transmission apparatus 10 includes optical wiring boards 20A in each of which a reflective optical waveguide 23, which is formed into a planar shape, and a plurality of optical fibers 26, which are optically connected to the waveguide, are sealed by a sealing member 27 made of a sealing resin to be integrated with one other. A plurality (in the figure, two) of nodes 4 are optically connected to each other by an optical wiring module 20 in which the optical wiring boards 20A are stacked to be modulized. It should be noted that the components, which are identical with those of the first embodiment, are denoted by the same reference numerals and duplicated description will be omitted.

The waveguide 23 is configured by: a planar core having one end face 23a to which the optical fibers 26 are optically connected, and a reflective light diffusing section 23c formed on another end face 23b which is opposite to the one end face 23a; and a clad which is formed on the upper, lower, and right and left side faces of the core except the one end face 23a and the other end face 23b and is lower in refractive index than the core. The core is made of, for example, a plastic material such as polymethyl methacrylate (PMMA), polycarbonate, or amorphous polyolefin, or inorganic glass.

The clad is made of a fluoropolymer or the like.

The reflective light diffusing section 23c is made of a metal material such as aluminum and formed by a film forming method such as sputtering. Alternatively, the reflective light diffusing section 23c may be formed by another method as far as the transparency of the film formation face is not lowered and the waveguide 23 is not thermally affected.

The optical fibers 26 are positioned and fixed by a positioning member 28 so that positional accuracy with respect to the optical communication section 41 is ensured, and then sealed by the sealing member 27. The optical fibers 26 are optically connected to a laser diode and a photodiode (not shown) of the optical communication section 41, respectively.

A light signal, which is emitted from the laser diode of the optical communication section 41 to the corresponding optical fiber 26, enters the waveguide 23 through the one end face 23a to be reflected and diffused by the reflective light diffusing section 23c, and then is output from the optical fibers 26. The photodiode of the optical communication section 41 receives a light signal from the corresponding optical fiber 26.

In the second embodiment described above, the optical communication section 41 and the waveguide 23 are connected to each other by using the optical fibers 26. The degree of freedom in arrangement of the nodes 4 can be improved.

Figure 7:
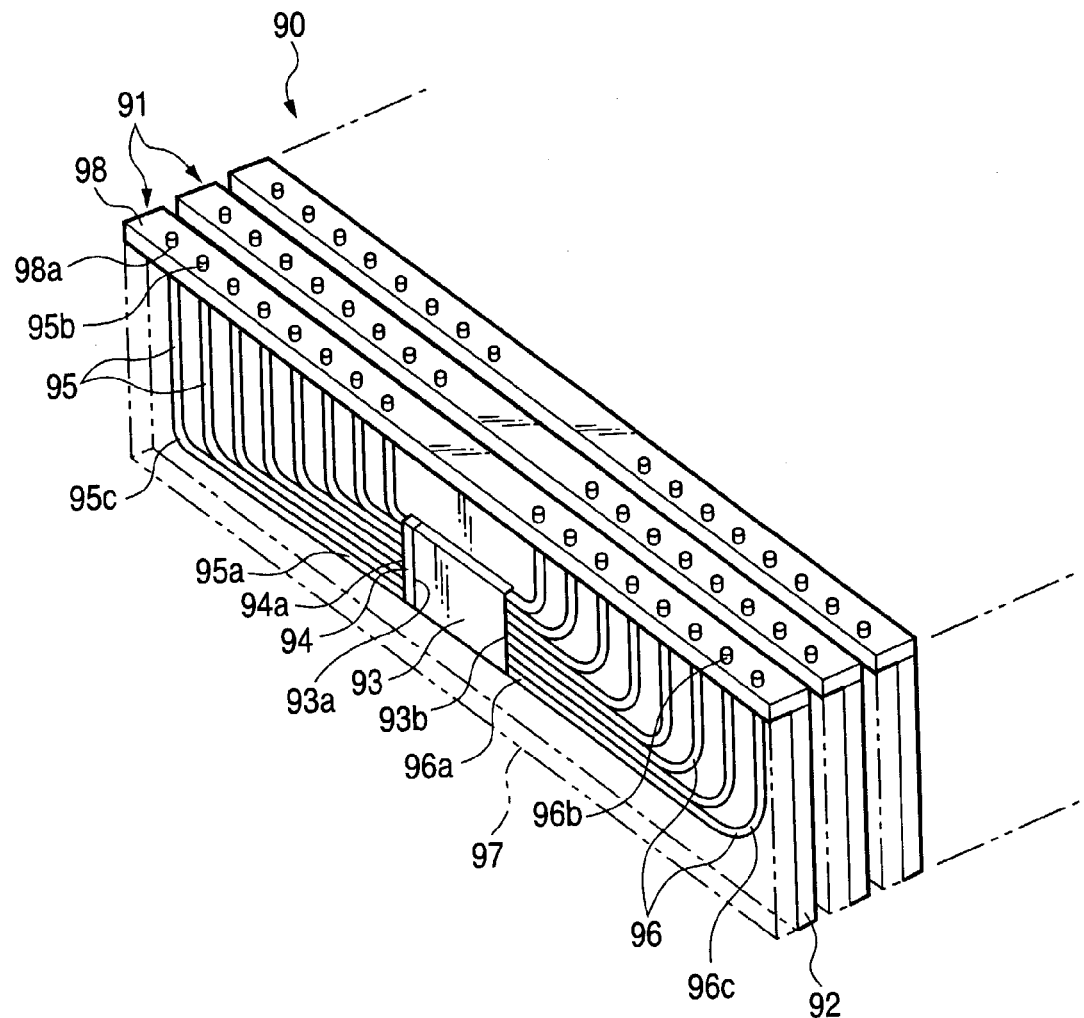
FIG. 7 is a perspective view of optical wiring boards in a third embodiment of the invention.
Figure 8A:
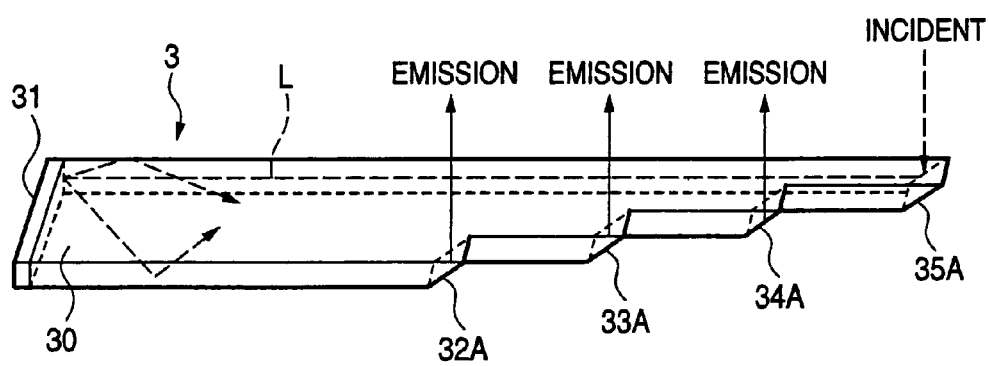
FIGS. 8A and 8B are diagrams illustrating the operation of an optical transmission path disclosed in JP-A-2002-62457.
Figure 8B:
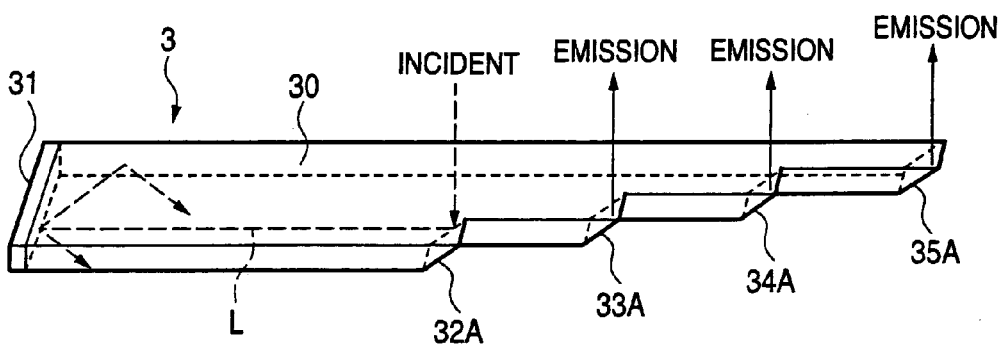

FIG. 7 shows an optical wiring module 90 in a third embodiment of the invention. The optical wiring module 90 is formed by stacking transmissive optical wiring boards 91 to be modulized.

Each of the optical wiring boards 91 includes: a support substrate 92; a planar waveguide 93 which is placed on the support substrate 92; a plurality (for example, 8) of first optical fibers 95 in which the tip ends 95a are optically connected via a transmissive diffuser 94 to a light entering face 93a that is one end face of the waveguide 93; a plurality (for example, 8) of second optical fibers 96 in which the tip ends 96a are optically connected to a light emitting face 93b that is the other end face of the waveguide 93; and a positioning member 98 in which rear end portions 95b and 96b of the optical fibers 95 and 96 are passed through positioning holes 98a to position the rear end portions 95b and 96b. The optical components, or the waveguide 93, the transmissive diffuser 94, and the optical fibers 95 and 96 are sealed by a sealing member 97 made of a resin. In FIG. 7, the sealing member 97 is shown as a transparent member.

A material of the support substrate 92 includes a metal such as aluminum, a resin such as polymethyl methacrylate (PMMA), glass, ceramics, or the like. The material of the board is not particularly restricted as far as the positioning and fixation of the optical components are not adversely affected. Alternatively, a flexible substrate made of polyimide or the like may be used.

The waveguide 93 is configured by: a planar core made of a transparent material; and a clad which is formed on the upper, lower, and right and left side faces of the core except the light entering face 93a and the light emitting face 93b, and which is lower in refractive index than the core. The core is made of, for example, a plastic material such as polymethyl methacrylate (PMMA), polycarbonate, or amorphous polyolefin, or inorganic glass. The clad is made of a fluoropolymer or the like. In the case where the sealing member 97 functions also as a clad, the clad may be omitted.

As the transmissive diffuser 94, useful is a diffuser in which an epoxy layer is formed on a substrate of a resin such as an acrylic resin, polycarbonate, or polyester and then cured by ultraviolet rays, and a concave and convex pattern for diffusing light is formed on a light entering face (diffusion portion) 94a, or that in which a concave and convex pattern is formed directly on the light entering face (diffusion portion) 94a by injection molding.

Each of the first and second optical fibers 95 and 96 is configured by a core which has an outer diameter of, for example, 0.5 mm, and which has a circular section shape, and a clad which is disposed around the core. The rear end portions 95b and 96b are bent at curved portions 95c and 96c so as to be perpendicular to the long side of the support substrate 92 and slightly exposed from the long side of the support substrate 92. In the case where the sealing member 97 functions also as a clad, the clads of the optical fibers 95 and 96 may be omitted.

As the sealing member 97, useful is a resin such as a silicone resin, or an epoxy resin. Such a resin can be cured by cold curing, heat curing, UV curing, or another curing process. The method of applying the resin for the sealing member 97 is not particularly restricted, and may be any one of methods including a pouring method which will be described later, application by a roller, application by a blade, a screen printing method, and a spin coating method as far as the resin can be applied in a desired thickness. Alternatively, a member which is fused when heated and cured when returned to ordinary temperature, such as a heat-fusible resin film which will be described later may be used.

In the third embodiment described above, since the first optical fibers 95 and the second optical fibers 96 are connected to the sides of the waveguide 93, the optical communication sections of the nodes 4 which have been described in the first and second embodiments can be optically connected to the rear end portions 95b and 96b to enable a many-to-many communication using a light signal. Therefore, the degree of freedom in arrangement of the nodes 4 can be improved, and a larger number of nodes 4 can be optically connected.

As described above, according to the optical transmission apparatus of the invention, serial data which is coded so that a constant mixture ratio of 1 or 0 is attained on the basis of transmission data is transmitted, and, even in a state where data transmission is not performed, a dummy signal is emitted to an optical transmission path and light emission from plural nodes is restricted. Therefore, it is possible to provide an optical transmission apparatus in which transmission timings of plural nodes do not coincide with one another, the signal recognizability is prevented from being lowered, and high-speed stable optical transmission that is excellent in reliability can be realized.

What is claimed is:

1. An optical transmission apparatus for transmitting an optical signal, comprising:
  a plurality of circuit boards each including:
    a data conversion section for converting transmission data into conversion data in which mixture ratio of signals "0" and signals "1" is a constant;
    an optical communication section for outputting the optical signal based on the conversion data;
    a control section; and
  an optical transmission path connecting the circuit boards optically,
  wherein the control section monitors the optical transmission path and sets the optical communication section in a waiting state when the optical transmission path operates so that only a single one of the plurality of circuit boards is capable of transmitting transmission data over the optical transmission path at one time.

2. The optical transmission apparatus according to claim 1, wherein the control section of a single one of the circuit boards designated to control the optical communication section to emit a dummy signal as a light signal when a state where the optical transmission path does not operate continues for a predetermined time period.

3. The optical transmission apparatus according to claim 1, wherein the control section of one of the circuit boards controls the optical communication section to emit a light signal when the control section of the one of the circuit boards obtains a control right of the optical transmission path.

4. The optical transmission apparatus according to claim 1, wherein when the optical communication section of one of the circuit boards outputs a light signal, the control sections of the others of the circuit boards checks a state of the optical transmission path based on a busy signal output from the control section of the one of the circuit boards.

5. The optical transmission apparatus according to claim 1,
  wherein the optical communication section of each of circuit boards includes:
    a laser diode, which is a light emitting element; and
    a photodiode, which is a light receiving element.

6. The optical transmission apparatus according to claim 5, wherein in a waiting state, the laser diode is driven at a level not more than a quantization level.

7. The optical transmission apparatus according to claim 1, wherein a semiconductor device including the data conversion section and the control section is mounted on each of circuit boards.

* * * * *